United States Patent
Stracke, Jr.

[11] Patent Number: 6,047,330
[45] Date of Patent: Apr. 4, 2000

[54] VIRTUAL ROUTER DISCOVERY SYSTEM

[75] Inventor: John Richard Stracke, Jr., Santa Clara, Calif.

[73] Assignee: Netscape Communications Corporation, Mountain View, Calif.

[21] Appl. No.: 09/009,713

[22] Filed: Jan. 20, 1998

[51] Int. Cl.[7] .................................................. G06F 13/00
[52] U.S. Cl. ......................... 709/238; 709/223; 370/409
[58] Field of Search ................... 709/220, 223, 709/224, 238, 242, 243, 249, 300; 370/351, 389, 395, 401, 409

[56] References Cited

U.S. PATENT DOCUMENTS

| | | | |
|---|---|---|---|
| 5,612,959 | 3/1997 | Takase et al. | 370/390 |
| 5,751,967 | 5/1998 | Raab et al. | 709/228 |
| 5,752,003 | 5/1998 | Hart | 709/223 |
| 5,825,772 | 10/1998 | Dobbins et al. | 370/396 |
| 5,850,397 | 12/1998 | Raab et al. | 370/392 |
| 5,909,549 | 6/1999 | Compliment et al. | 709/223 |
| 5,920,566 | 7/1999 | Hendel et al. | 370/401 |

OTHER PUBLICATIONS

Corson et al., Mobile Ad–hoc Networks (manet), Nov. 1997.

*Primary Examiner*—Viet D. Vu
*Attorney, Agent, or Firm*—Michael A. Glenn

[57] ABSTRACT

A router discovery system for virtual routers automatically builds a multicast virtual network over an existing network topology. The virtual routers send out "heartbeats" across the Internet Protocol (IP) multicast network marked with a Time to Live (TTL) value containing the number of hops that the packet can take through the network before it gets discarded. The originating router gets an estimate of how far away the receiving router is when it receives the response packet from the receiving router (i.e. the receiving router is less than TTL hops away from the originating router). The invention uses the TTL values to find the closest routers. It balances the efficiency of the IP network connections with the distance of the routers to create a balanced network topology and establishes connections with the routers that meet these criteria. When a router comes alive, it sends out multicast packets across the network. Any routers that pick up the packets wait for a random amount of time and after the waiting period, if a router does not hear from any of the other routers that a connection was made, it establishes a connection with the new router. Ping messages are periodically sent between the routers that have established connections between themselves, testing the connection between the routers. The invention automatically and dynamically adapts to changes in the network topology. If a virtual router finds a more efficient connection to another router, it drops the less efficient connection. When a router goes down, the router's neighbors opens up connections to their next-nearest neighbors until the connectivity of the virtual network is restored.

19 Claims, 5 Drawing Sheets

VIRTUAL ROUTER DISCOVERY SYSTEM

BACKGROUND OF THE INVENTION

1. Technical Field

The invention relates to the setup and maintenance of computer networks in a computer environment. More particularly, the invention relates to the automatic setup of virtual networks and adaptive reconfiguration of network topology in a computer environment.

2. Description of the Prior Art

Virtual networks are created over the existing network topology. The connectivity of the network is taken advantage of by creating an efficient routing system through the network, i.e. a virtual network. When setting up a virtual network, it is necessary to configure the virtual routers to talk to each other.

One common approach is to statically configure which virtual routers will talk to other routers. The system administrator manually enters the network connections into each router. The network configuration does not change until the system administrator manually changes it. This requires maintenance and redundant links to get reliability because if one router goes down, messages cannot get through until that router comes back up.

Referring to FIG. 1, a network backbone 101 has been established in a local network and new users 102, 103 want to connect onto the backbone. The new users 102, 103 may have to connect through the Wide Area Network (WAN) link 105 to get to the backbone, which is much more expensive. If a new virtual router 104 is later added to the local network 101, then it would be more economical for the users 102, 103 to connect through the local router 104 rather than through the WAN 105. However, in a static configuration, the system administrator must tell each of the users 102, 103 of the existence of the new router 104 and have them reconfigure their machines.

Another approach is to do away with the virtual multicast system and run directly over the Internet Protocol (IP) multicast system. The drawback is that IP multicast is not flexible enough to perform the filtering that is needed. With respect to FIG. 2, a multicast application 201 has two sets of users 202, 203 that are not interested in each other's traffic. In an IP multicast system, either two multicast addresses would be needed which would be difficult to get authoritatively, or all of the users would simply receive everyone else's traffic.

It would be advantageous to provide a virtual routing system that automatically sets up the virtual network topology. It would further be advantageous to provide a virtual routing system that adapts to changes in the network connectivity by automatically reconfiguring the virtual network topology.

SUMMARY OF THE INVENTION

The invention provides a virtual router discovery system. The invention uses a router discovery system for virtual routers that automatically builds a multicast virtual network over an existing network topology. In addition, the invention uses an adaptable router system that enables the virtual routers to reconfigure the virtual network topology automatically in response to changes in the underlying network connectivity.

The virtual routers send out "heartbeats" across the Internet Protocol (IP) multicast network. Each heartbeat multicast packet is marked with a Time to Live (TTL) value. The TTL value contains the number of hops that the packet can take through the network before it gets discarded.

The originating router gets an estimate of how far away the receiving router is when it receives the response packet from the receiving router (i.e. the receiving router is less than TTL hops away from the originating router). The invention uses the TTL values to find the closest routers. It balances the efficiency of the network connections with the distance of the routers to create a balanced network topology. Connections are established with the routers that meet these criteria.

When a router comes alive, it sends out multicast packets across the network. Any routers that pick up the packets wait for a random amount of time. If, after the waiting period, a router does not hear from any of the other routers that a connection was made, it establishes a connection with the new router.

Ping messages are periodically sent between the routers that have established connections between themselves. The ping messages test the connection between the routers.

The invention automatically and dynamically adapts to changes in the network topology. If a virtual router finds a more efficient connection to another router, it may drop the less efficient connection. When a router goes down, the router's neighbors open up connections to their next-nearest neighbors until the connectivity of the virtual network is restored. For greater reliability, routers may maintain redundant connections to reduce service outages when their neighbors go down.

Other aspects and advantages of the invention will become apparent from the following detailed description in combination with the accompanying drawings, illustrating, by way of example, the principles of the invention.

DETAILED DESCRIPTION OF THE INVENTION

Figure 1:
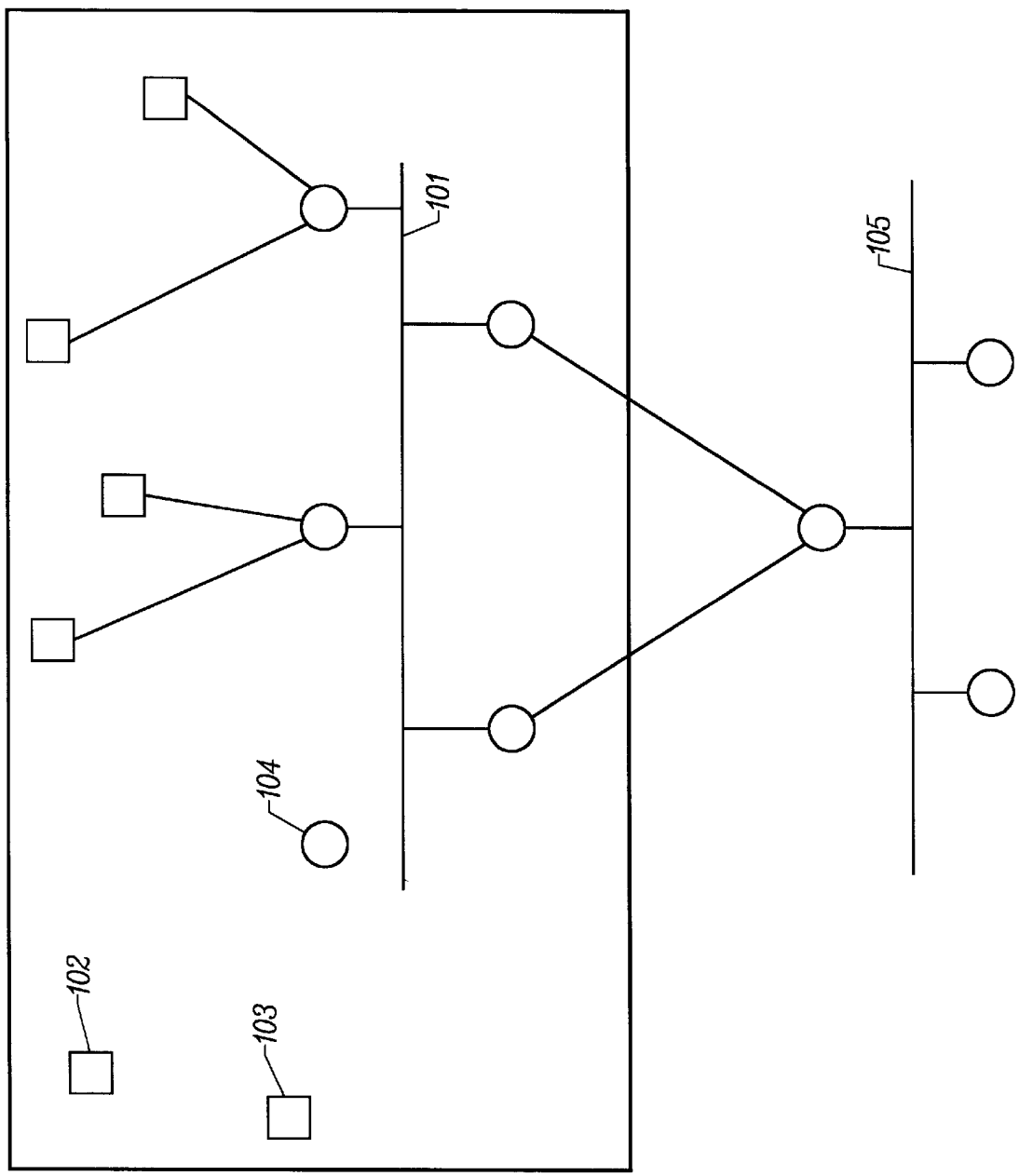
FIG. 1 is a block schematic diagram of a network connection with an internal backbone and a Wide Area Network (WAN)
Figure 2:
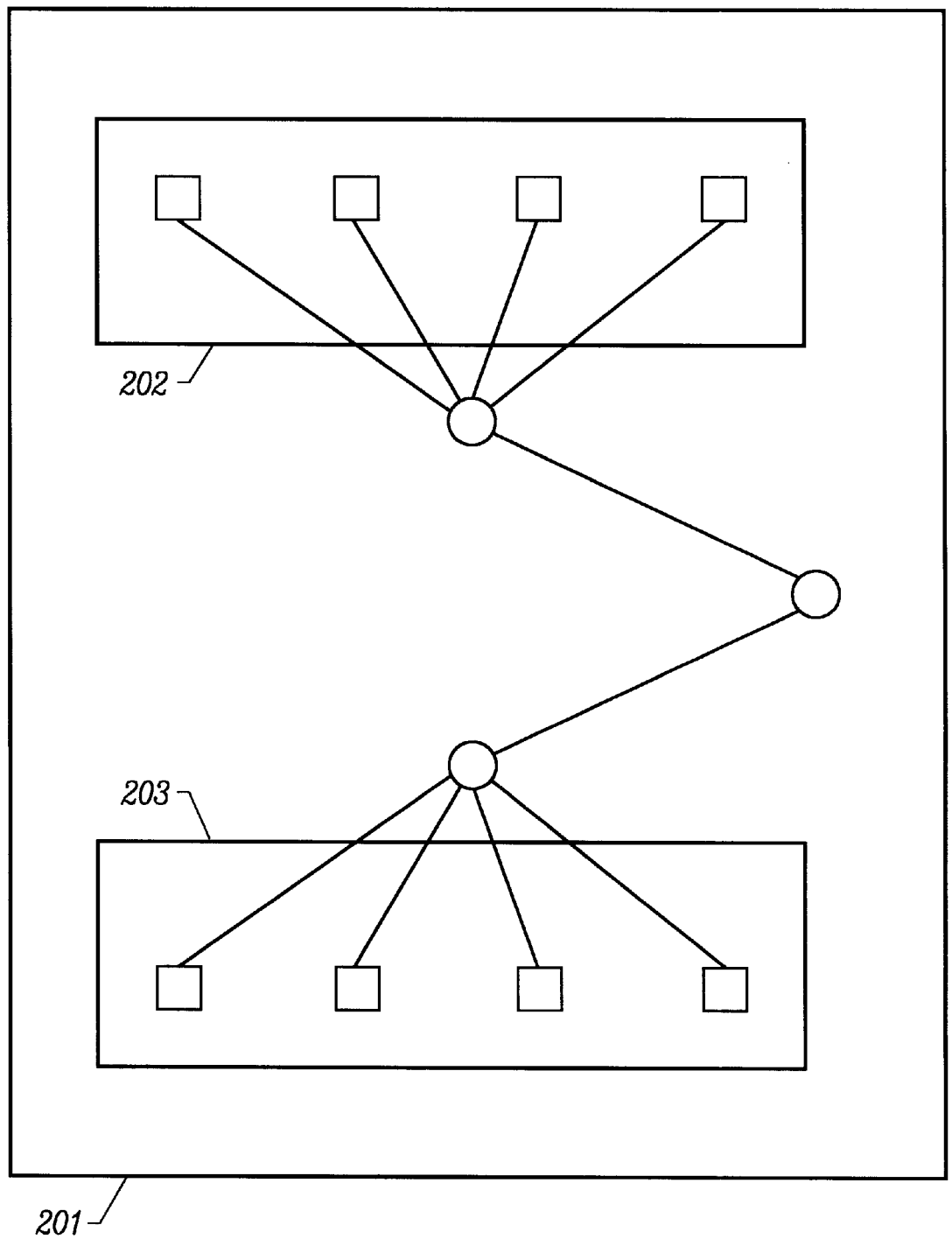
FIG. 2 is a block schematic diagram of two sets of users in a multicast environment.

As shown in the drawings for purposes of illustration, the invention is embodied in a virtual router system for computer applications. A system according to the invention provides a router discovery system capable of automatically configuring a virtual network topology.

A virtual router system according to the invention provides an easily configurable system that automatically sets up a virtual network on top of a multicast network. The system additionally reconfigures the virtual network topology to adapt to changes in the underlying network connectivity.

Configuration of the virtual network has been a difficult problem and has been a threat to the deployment of push network technology. The invention creates a multicast virtual network built over the existing multicast network, e.g. a set of server processors (virtual routers) that talk to each other. When the sender wants to send out information, the routers perform the work to get the information to all of the desired recipients. This technique is referred to as multicast because the router ideally sends no more than one copy of the information across a given network link.

Internet Protocol (IP) multicast operates in a similar fashion. IP multicast is used by virtual routers to find other virtual routers. The virtual routers send out periodic "heartbeats" across the IP multicast network. Each heartbeat multicast packet is marked with a Time to Live (TTL) value. The TTL is the number of hops that the packet can take through the network before it gets discarded. A single hop is from one IP router to another IP router. The heartbeat packet tells any virtual router within the TTL range that the sender is alive. The sender finds its closest neighbors by starting the TTL value at one and slowly increasing the TTL value.

Figure 3:
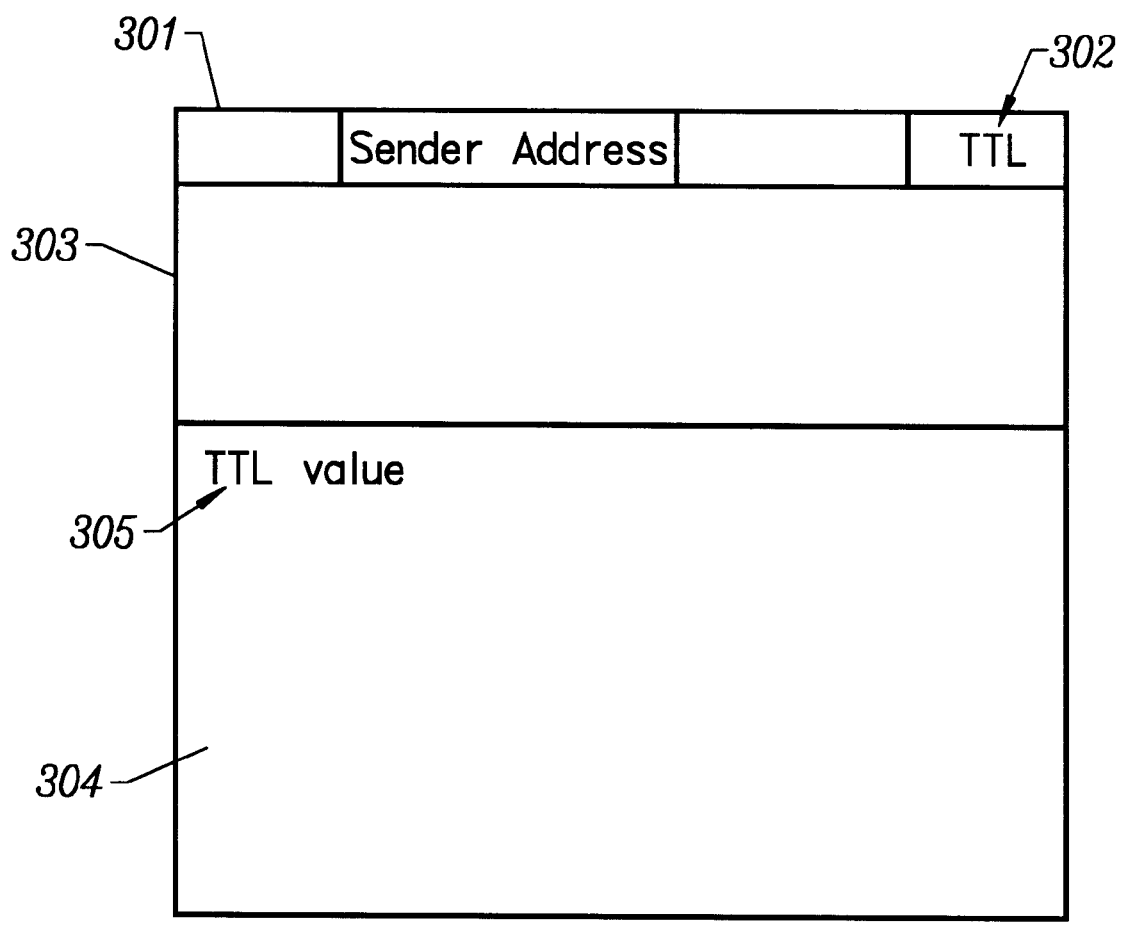
FIG. 3 is a schematic diagram of a heartbeat multicast packet according to the invention.

Referring to FIG. 3, the heartbeat multicast packet 301 contains the TTL value 303 in the header of the packet 302. The TTL value 305 is also placed in the body of the packet 304. THE TTL value 308 is decremented at each hop, but the receiving router knows what the TTL value 305 is by reading the body of the packet 304. The originating router gets an estimate of how far away the receiving router is when it receives the response packet from the receiving router (i.e. the receiving router is less than TTL hops away from the originating router). The router uses the TTL values to find the closest routers. It balances the efficiency of the network connections with the distance of the routers to create a balanced network topology. Connections are established with the routers that meet these criteria.

The system relies on the IP multicast network. The IP network carries multicast packets. The address of the sender is contained in the multicast packet. If a router wants to talk to the sending router, it talks to that router through the established virtual network. If the virtual network does not exist, then it attempts to connect to the sending router anyway.

Although the invention is described as being applied to IP multicast networks, one skilled in the art can readily appreciate that the invention can also be used with other underlying network protocols that provide receiver-directed multicast services, permitting the sender to specify a limited lifespan for packets in the same manner as a TTL value described above.

When a new router comes alive, it sends out multicast packets across the network. Any routers that pick up the packets wait for a random amount of time before attempting to communicate with the new router. If, after the waiting period, a router does not hear from any of the other routers that a connection was made, it establishes a connection with the new router.

Ping messages are periodically sent between the routers that have established connections between themselves. The ping messages test the connection between the routers.

Although the invention is described as being applied to push networks, one skilled in the art can readily appreciate that the invention can also be used for applications such as Network News Transfer Protocol (NNTP) servers. Usenet requires static configuration. The invention allows the NNTP servers to discover other servers without requiring static configuration.

Figure 4:
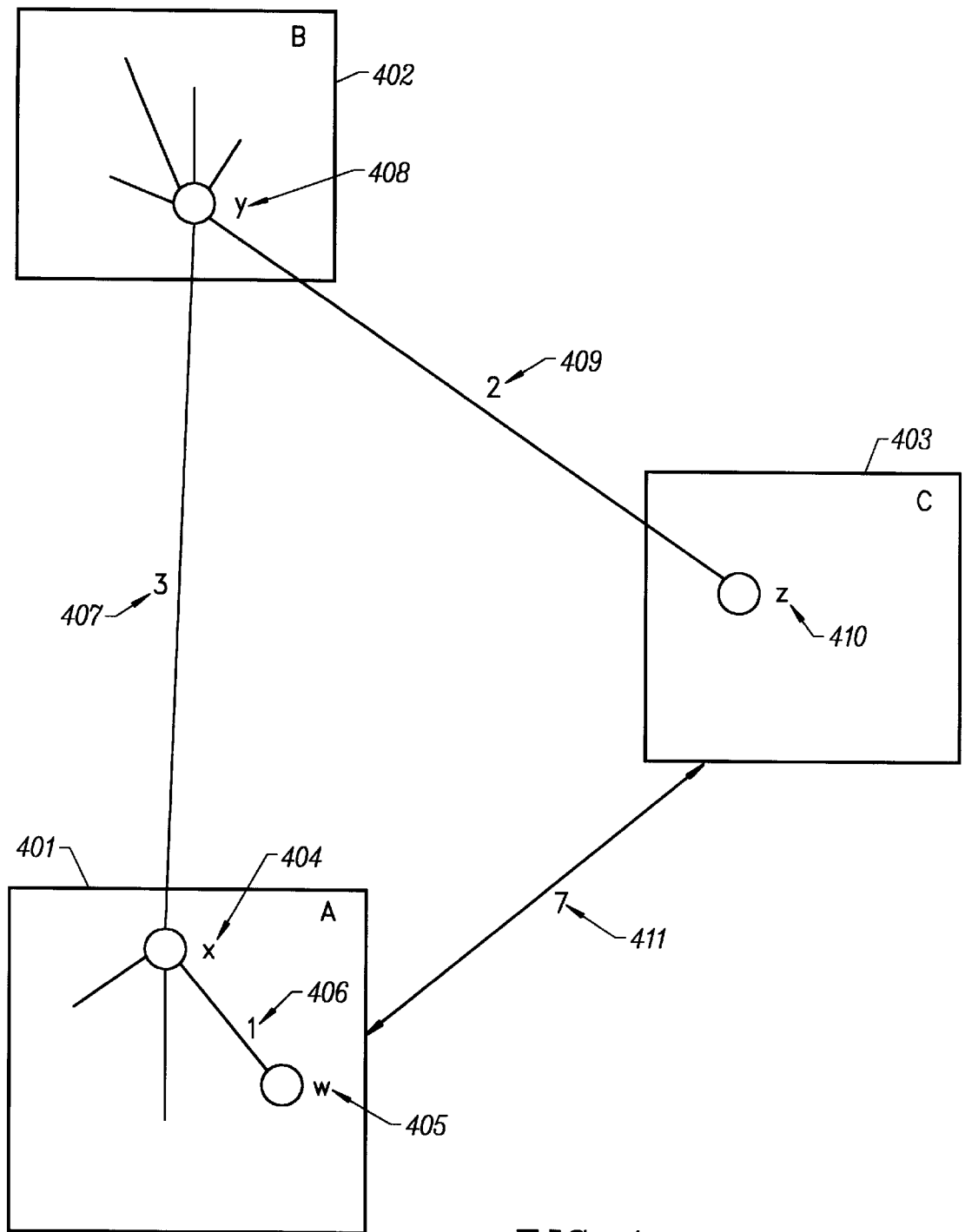
FIG. 4 is a block schematic diagram of a virtual network scenario according to the invention.

With respect to FIG. 4, the majority of corporations have fast connectivity within themselves. In this example of a preferred embodiment, initially, site A 401 starts up its virtual router x 404. The virtual router x 404 sends out multicast heartbeats. It does not hear anything from any other routers so it waits. Site B 402 starts up its virtual router y 408 and sends out heartbeats. Router y 408 starts to pick up router x's 404 packets and, because no connection has been opened between the two routers, either router opens a connection with the other and establish a link with the other site. Any client that is connected to either router can now talk to any of the clients connected to the other router. This scenario continues on, with each router sending ping messages to each other to test the connection and measure the distance between each other.

Another virtual router w 405 is started up at site A 401 and starts sending out heartbeats. The router w 405 is one hop 406 away from router x 404 at site A 401. Router x 404 sees that router w 405 is one hop away. It also sees that it cannot reach router w 405 through the current virtual network and connects to it. The initiation of the connection can happen at either router.

Router y 408 at site B 402 sees router w's 405 heartbeat packets. It sees that router w 405 is four hops away. It has already established a connection with router x 404 at site A 401 that is three hops 407 away. It forgoes creating a link with router w 405 because it has a connection to site A 401 through router x 404 and it is more efficient to piggyback the connection to router w 405 through this connection.

Router z 410 at site C 403 starts to send heartbeats. It is seven hops 411 away from site A 401 and two hops 409 away from site B 402. The site A 401 routers takes longer to see router z 410 at site C 403 because router z 410 has to send a heartbeat with a TTL with at least seven for the routers at site A 401 to see the packet. Router y 408 at site B 402 sees router z 410 almost immediately.

This protocol may be used to optimize a network topology, but the system does not have to be tied to it. The invention automatically and dynamically adapts to changes in the network topology. If a virtual router finds a more efficient connection to another router, it may drop the less efficient connection. When a router goes down, the router's neighbors open up connections to their next-nearest neighbors until the connectivity of the virtual network is restored. For greater reliability, routers may maintain redundant connections to reduce service outages when their neighbors go down.

Figure 5:
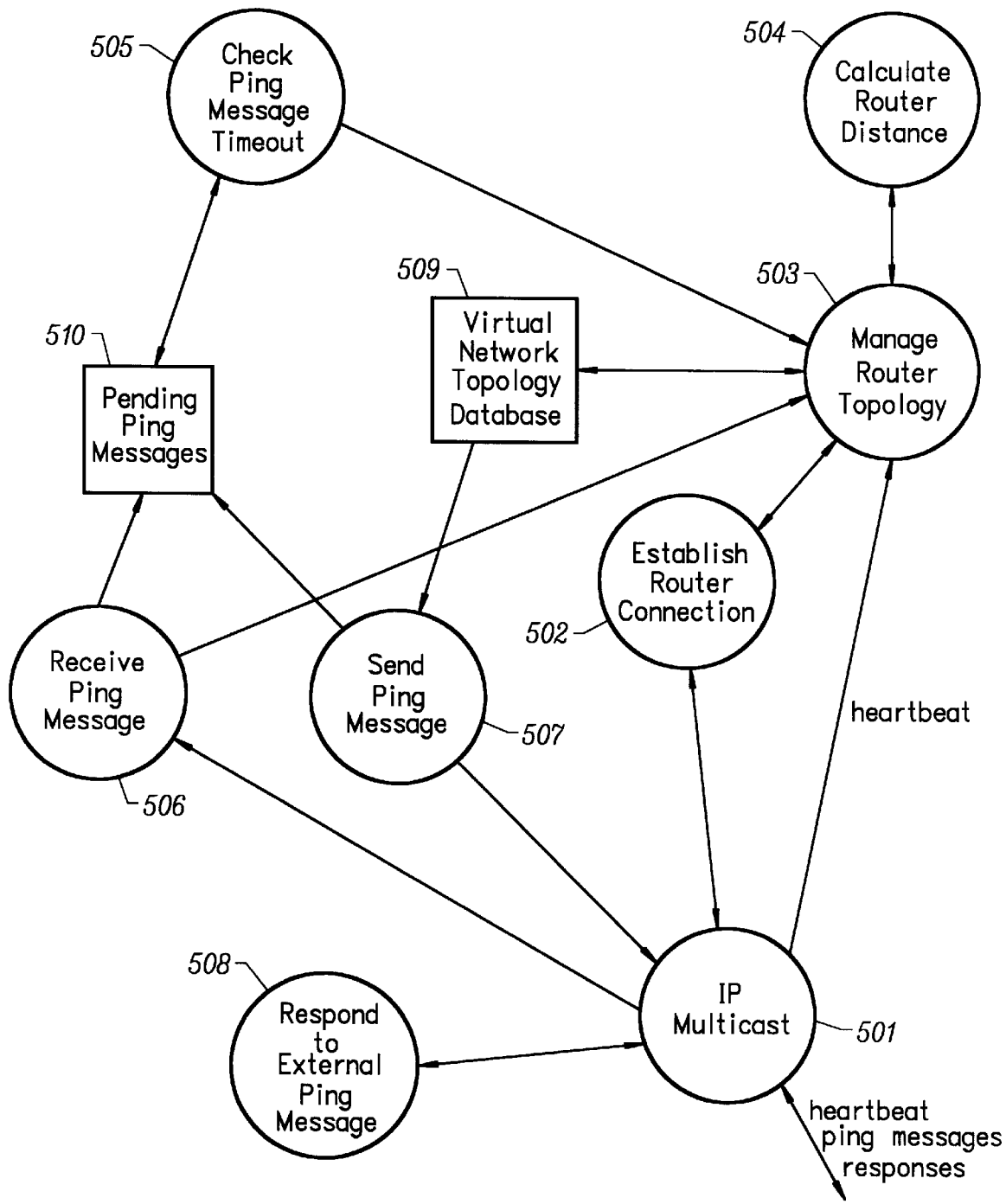
FIG. 5 is a block schematic diagram of a task oriented view of a preferred embodiment of the invention according to the invention.

Referring to FIG. 5, the IP multicast system 501 carries heartbeat packets across the IP network. The Manage Router Topology task 503 manages the virtual network connections. It automatically updates the virtual network topology database 509 with the latest connections to other virtual routers. The Manage Router Topology task 503 receives external heartbeat packets from the IP multicast task 501 and checks the virtual network topology database 509 for any new possible router connections. Distances to the other routers are calculated by the Calculate Router Distance task 504. The Manage Router Topology task 503 can be configured to create connections selectively with other virtual routers, such that it can filter out any section of the virtual network that it does not care about. Any connections with virtual routers are made through the Establish Router Connection task 502. As previously mentioned, the Manage Router Topology task 503 determines if it is more efficient to open a new connection, route through an existing connection, or drop an existing connection. If any new routers are discovered, the Manage Router Topology task 503 randomly picks a wait time and, after the timeout occurs, if it does not hear from any other routers that a connection has been established with the new router, then it establishes a connection with the router.

In order to maintain the virtual network, it is necessary to be able to monitor its state. Some virtual networks may permit the Manage Router Topology task 503 to perform this monitoring explicitly; if so, this capability should be used. If not, however, it is possible to use ping messages to probe the state of the virtual network.

Ping messages are sent by the Send Ping Message task 507, which periodically tests connections by sending ping messages to all of the routers with established connections in the Virtual Topology Database 509. Pending ping messages are logged in the pending ping messages database 510. The responses to ping messages are recorded in the pending ping messages database 510 by the Receive Ping Message task 506. In the case where the network setup allows the originating router to receive an indication that the ping message did not reach the intended router, the Receive Ping Message task 506 tells the Manage Router Topology task 503 that the router is missing. When there is no such indicator, the Check Ping Message Timeout task 505 measures the time elapsed since the ping message was sent to a router. If a response does not arrive from a router that was sent a ping message within the timeout value, then the Check Ping Message Timeout task 505 notifies the Manage Router Topology task 503 that the router is missing.

The Manage Router Topology task 503 updates the virtual network topology database 509 with the missing router and adapts the virtual network topology to work around the missing router. It returns the network topology back to normal when the missing router reappears.

Any pings originating from other routers are answered by the Respond to External Ping Messages task 508.

Every virtual router in the system operates in the same manner as described.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

I claim:

1. A process for router discovery across a virtual network in a computer environment, comprising the steps of:

managing network topology, said managing step automatically setting up virtual network connections;

sending periodic ping messages to virtual routers with established connections;

receiving answers to said ping messages;

sending periodic heartbeat packets across an underlying network;

calculating router distance using Time to Live (TTL) values; and answering ping messages from other virtual routers.

2. The process of claim 1, further comprising the step of:

detecting missing routers.

3. The process of claim 1, wherein said managing step adapts to network topology changes and updates a virtual network topology database with new and missing routers.

4. The process of claim 1, further comprising the step of:

establishing connections with virtual routers.

5. The process of claim 1, wherein said managing step temporarily adapts the virtual network topology to work around missing routers and restores the virtual network topology when the routers reappear.

6. The process of claim 1, wherein said managing step determines whether it is more efficient to open a new connection, route through an existing connection, or drop an existing connection.

7. The process of claim 1, wherein said managing step selects a random backoff time before attempting to initiate a connection when a new router is detected.

8. The process of claim 1, wherein said managing step selects which virtual routers are appropriate to add to the virtual network.

9. The process of claim 1, wherein said managing step receives heartbeat packets from other routers.

10. The process of claim 1, further comprising the steps of:

sending periodic network monitoring messages to virtual routers with established connections; and answering network monitoring messages from other virtual routers.

11. An apparatus for router discovery across a virtual network in a computer environment, comprising:

a module for managing network topology, said managing module automatically sets upvirtual network connections;

a module for sending periodic ping messages to virtual routers with established connections;

a module for receiving answers to said ping messages;

a module for sending periodic heartbeat packets across an underlying network;

a module for calculating router distance using Time to Live (TTL) values; and a module for answering ping messages from other virtual routers.

12. The apparatus of claim 11, further comprising:

a module for detecting missing routers.

13. The apparatus of claim 11, wherein said managing module adapts to network topology changes and updates a virtual network topology database with new and missing routers.

14. The apparatus of claim 11, further comprising:

a module for establishing connections with virtual routers.

15. The apparatus of claim 11, wherein said managing module temporarily adapts the virtual network topology to work around missing routers and restores the virtual network topology when the routers reappear.

16. The apparatus of claim 11, wherein said managing module determines whether it is more efficient to open a new connection, route through an existing connection, or drop an existing connection.

17. The apparatus of claim 11, wherein said managing module selects a random backoff time before attempting to initiate a connection when a new router is detected.

18. The apparatus of claim 11, wherein said managing module selects which virtual routers are appropriate to add to the virtual network.

19. The apparatus of claim 11, wherein said managing module receives heartbeat packets from other routers.

* * * * *